Figure 1:
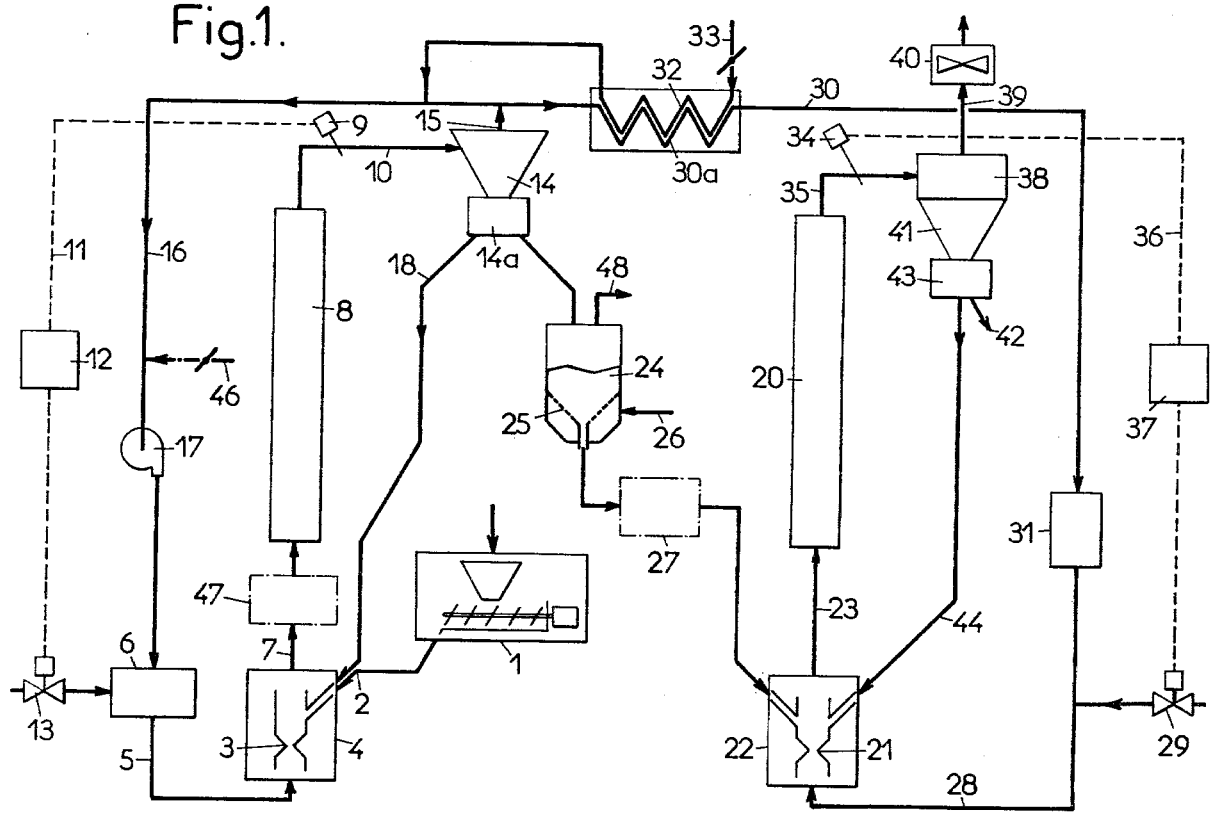

United States Patent [19]

Remillieux et al.

[11] 4,276,019
[45] Jun. 30, 1981

[54] PROCESS FOR REGENERATING OF AN ADSORBING MATERIAL IN THE FORM OF PARTICLES CHARGED WITH AT LEAST TWO VOLATILE COMPOUNDS HAVING DIFFERENT THERMAL STABILITIES

[75] Inventors: Jean Remillieux, Versailles; Albert Rebours, Chatou; Philippe Dumortier, Sartrouville; Paul H. L. Marchal, Garches, all of France

[73] Assignee: Air Industrie, France

[21] Appl. No.: 89,370

[22] Filed: Oct. 30, 1979

[30] Foreign Application Priority Data

Oct. 31, 1978 [FR] France .................. 78 30940
Feb. 5, 1979 [FR] France .................. 79 02941

[51] Int. Cl.³ .......................................... F27B 15/00
[52] U.S. Cl. ............................... 432/1; 432/14; 432/18; 432/58
[58] Field of Search ............. 432/1, 14, 15, 16, 18, 432/192, 58

[56] References Cited

U.S. PATENT DOCUMENTS 3,904,549  9/1975  Barton et al. .................... 432/15
4,174,946  11/1979  Rohde .............................. 432/14

FOREIGN PATENT DOCUMENTS 2140230  1/1973  France .
381651  11/1964  Switzerland .

Primary Examiner—John J. Camby
Attorney, Agent, or Firm—Brumbaugh, Graves, Donohue & Raymond

[57] ABSTRACT

Calcination of one of the volatile compounds is brought about in a first contacting column, in which the material is driven and put into suspension by an oxidizing gas stream, while being brought therein to a sufficiently high temperature, and the gaseous products desorbed in this first column are re-adsorbed by cooling in a second contacting column.

This process applies principally to the regeneration of particles of alumina which have absorbed tars and compounds containing fluorine.

17 Claims, 2 Drawing Figures

PROCESS FOR REGENERATING OF AN ADSORBING MATERIAL IN THE FORM OF PARTICLES CHARGED WITH AT LEAST TWO VOLATILE COMPOUNDS HAVING DIFFERENT THERMAL STABILITIES

The present invention relates to a process for the regeneration of an adsorbent material in the form of particles charged with at least two volatile compounds having different thermal stabilities.

It is known that it is current practice to use adsorbent materials for purifying smoke charged with harmful products before discharging this smoke into the atmosphere. Thus it is that alumina is currently used, for example, for purifying the smoke from furnaces for baking anodes intended for electrolysis tanks, in the aluminium industry, this smoke containing particularly tars and compounds containing fluorine.

However, the problem is posed of regenerating the adsorbent particles charged with tars, compounds containing fluorine, or other harmful products, without the regeneration releasing these products, particularly the fluorine, into the atmosphere, and this while also removing the carbon dust which they may carry.

Some processes use, to this end, rotary furnaces. The installations used have however the disadvantage of being cumbersome and expensive, and whose maintenance is also expensive. In addition, these furnaces may be the seat of accumulations of material, causing unstable combustion.

Others use fluidization of the adsorbent materials to be regenerated, by means of very hot air. In this case, difficulties arise because of the high pressure loss created by the fluidized bed, which results in considerable consumption of energy for blowing and, furthermore, the bed tends to be choked up by the dust.

In both cases, the compounds containing fluorine are heavily volatilized and a complementary purification of the air is provided to render it non-polluting for being discharged into the atmosphere.

The aim of the present invention is to provide a new process capable of resolving this problem of the regeneration of adsorbent particles, particularly of alumina, without the disadvantages of the known processes.

For this, a process for the regeneration of an adsorbent material in the form of particles charged with at least two volatile compounds having different thermal stabilities is, in accordance with the invention, characterized in that calcination of one of said volatile compounds is caused in a first contacting column, in which said material is driven along and brought into suspension by an oxidizing gas stream, while being brought therein to a sufficiently high temperature, in that, at the outlet of said contacting column, a separation is effected between, on the one hand, said material, partially purified and, on the other hand, the driving gas and the gaseous products desorbed in the first column and in that, in a second contacting column, cooling of at least a part of said partially purified material is caused by bringing into suspension therein, while being driven along, in at least a part of the gases coming from the above-mentioned separation, these gases being cooled, so as to re-adsorb in this second column, on said material, said gaseous products desorbed in the first.

Thus, the gases from the second contacting column may be discharged into the atmosphere simply after conventional filtering, without it being necessary to provide an additional purifying installation, for example for removing the fluorine, in the case of the application mentioned above where the adsorbent material is charged with tars and compounds containing fluorine. This fluorine is in effect re-adsorbed in said second column, having been desorbed in the first, and this without any additional consumption of alumina.

As for the the product calcinated in this first column, it will be understood that it is essentially a question of tars, still in the above-mentioned case of application.

The invention such as defined above in its most general form may well include other accessory arrangements.

In particular, it may be provided for a part, measurable, of said partially purified material obtained after the above-mentioned operation of separation to be recycled at the input of said first contacting column, to complete the calcination.

Similarly, with a separating operation provided also at the outlet of the second contacting column, between the gases causing suspension and the adsorbent material, it may also be provided for this material to be at least partially recycled at the inlet to said second column, to complete the re-adsorption, therein, of said gaseous products desorbed in the first column.

It may furthermore be provided, in a way known per se, for the bringing into suspension of the adsorbent material to be effected, not only upstream of the first contacting column but also upstream of the second, by supplying the material downstream of the neck of a venturi through which passes the gaseous flow supplying the column considered.

Moreover, to complete the calcination and to avoid as far as possible fine dust, for example of carbon, from sticking to the particles of adsorbent material from the first column, it may be provided for this material, after separation, to be subjected to an additional oxidization, before being reintroduced into said second column.

There may be provided, for this purpose, an oxidizing hopper with a porous bottom downstream of the separator which follows the first contacting column, oxygen or air being brought under this bottom to fluidize the material.

Furthermore, to avoid also, in the part of the gases coming from the separator and which supplies said second contacting column, the presence of dust which is too fine after being separated, for example carbon dust, it is possible for these gases to be filtered before being introduced into the second column.

As far as the gas circuits are concerned, a process in accordance with the invention may further be characterized in that said oxidizing gas stream which, in the first contacting column, drives along and brings into suspension the adsorbent material to be generated, is formed by hot air whose temperature is regulated automatically depending on the measured temperature at the outlet of the column, this air being possibly formed in part by new air, in part by recycling the already hot air obtained at the outlet of said first column after separation of the partially purified adsorbent material, the new air being moreover possibly pre-heated, in an exchanger, by taking heat from the part of the air directed towards the inlet of said second column.

Thus is obtained automatic regulation of the temperature in the first contacting column. On the other hand, the heat required brought from outside is reduced, by recovery of a part of the heat of the gases coming from the first column and, in the exchange, a first cooling of the air intended to supply the second column is carried out, which is favorable to re-adsorption.

This necessary cooling will moreover be increased by providing an input of new and fresh air, at a rate regulated automatically from a measurement of the temperature at the outlet of this column.

Despite a certain automatic regulation of the temperature, as mentioned above, obtained in the first contacting column, by injection of a certain quantity of new and fresh air at its inlet, a rise in temperature along this column may appear, which risks leading, at its outlet end, to a value not easily compatible with the resistance of the materials forming the installation. There may result therefrom, furthermore, the desorption of a largest quantity of some compounds, such as the fluorides, which it is undesirable to discharge into the atmosphere, that would lead to an increase in the dimensions of the subsequent means for removing the fluorine, which would increase the cost thereof.

This rise in temperature would obviously be limited by adopting a higher value for the gaseous current flow driving along the adsorbent material, but progress consists precisely in reducing this value, with the aim of reducing the dimensions and the cost of the installation.

It would also be possible to further lower the temperature of the gases at the inlet to the calcination column, and accordingly to avoid the overheating mentioned above. However, this arrangement would also lower the temperature of the tar combustion zone, with the risk that this combustion would no longer be initiated, causing extinction of the reaction.

Moreover, a considerable variation of the temperature along the calcination column would not thus be avoided, this variation causing heterogeneity of the reaction.

Furthermore, experience shows that, depending on the nature of the tars met with, combustion is more or less rapid. In addition, the size of the particles of adsorbent material may vary substantially, which also affects their heating-up rate: the result is that the distribution of temperatures along the calcination column may be affected thereby, overheating occuring either at the beginning of the distance covered, in the case of rapid combustion, or at the end of the distance covered, in the case of delayed combustion. This phenomenon may be accentuated by the presence, in more or less large proportions, of carbon-based dust, coming either from the smoke which the particles of alumina had served to purify, or more simply from a first stage of combustion of the tars.

Accordingly, the present invention aims further at avoiding such disadvantages and, at the same time improving the thermal efficiency of the process and, consequently, reducing the fuel costs.

For this, it may be provided for the over-heating of the gases driving the material to be regenerated in the calcination column to be directly eliminated, as it occurs, along the calcination column, by means of an auxiliary gas stream flowing inside a double casing surrounding said column over at least a part of its length. It is thus possible to limit the temperature in this column so as to obtain an even temperature along the path of the flow of gas and adsorbing material.

This auxiliary gas current may be, here again, formed at least in part by new and fresh air which is then introduced, after being mixed with the recycled gases, into the inlet of said calcination column.

Since this new air must be in any case reheated so as to bring about and maintain the calcination reaction, the heating obtained because of this flow in said double casing allows the fuel to be economized which would otherwise have been necessary. This forms an additional advantage of this improvement.

This stream of auxiliary gas contains an adjustable proportion of recycled hot gases coming from the calcination column. Thus is avoided the thermal shock in contact with said first column and the accompanying risk of extinction of the calcination reaction under the effect of an excessive local cooling.

The general direction of the flow of auxiliary gas is chosen depending on the nature of the products which will be treated in the installation: —the same direction as that of the flow of material to be calcinated if its characteristics are likely to cause combustion of the major part of the polluting compounds at the beginning of the reaction; thus, the coldest auxiliary gas is in contact with the zone releasing most heat and the zone where the combustion is completed is not cooled excessively —in the opposite direction to that of the flow of material to be calcinated, if its characteristics are likely to cause a more progressive development of the reaction; thus, the coldest auxiliary gas is in contact with the most active combustion zone, and the zone for initiating the reaction is not cooled excessively.

These arrangements make acceptable a considerable variation in the temperature of the stream of auxiliary gas, and allow consequently the over-heating to be absorbed with a fairly low gas rate, while still obtaining an excellent regulation of the temperature of the contacting column. The result is more economical dimensioning of the double casing.

According to another essential characteristic, the amount of new air introduced into the mixture which forms the flow of auxiliary cooling gas is regulated automatically and proportionally depending on the temperature of the gaseous current leaving the contacting column: since the cooling is precisely proportional to this amount of new air, it is thus possible, when the direction of flow of the stream of auxiliary gas is chosen as mentioned above, to stabilize perfectly the temperature of the column over the whole of its length.

It will also be noticed that the amount of heat to be absorbed by the cooling gas is proportional to the amount of pullutants to be burned: the amount of new air is then also proportional to this latter, which is an essential condition for good combustion.

Figure 2:
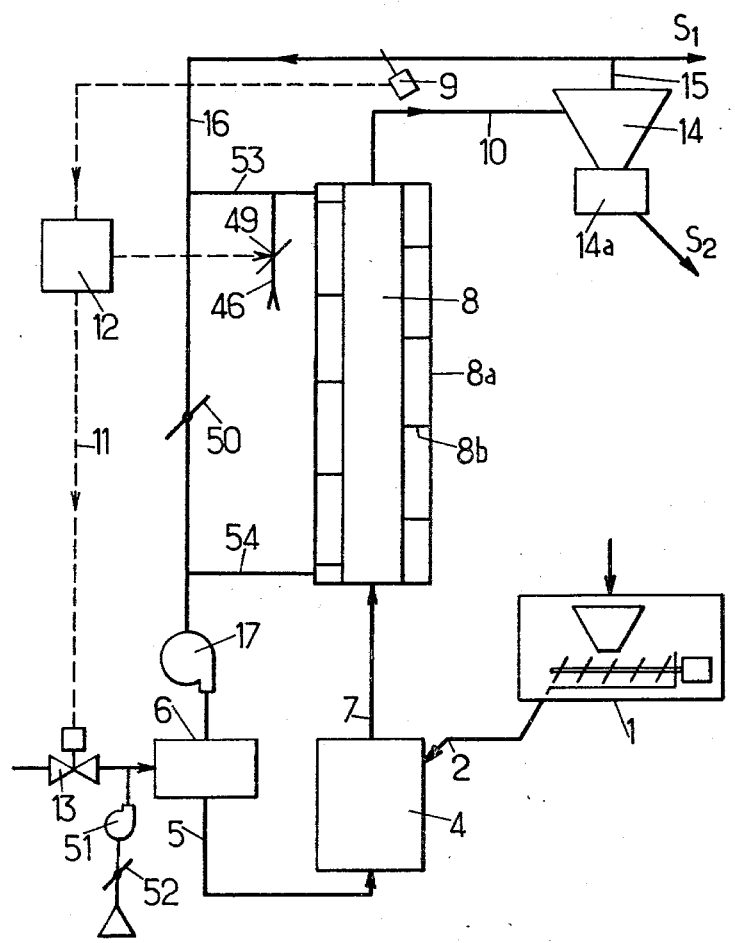

Two embodiments of the invention will now be described by way of nonlimiting examples, with reference to the figures of the accompanying drawing in which:

FIG. 1 shows schematically a complete installation for implementing the invention; and FIG. 2 is a partial schematic representation of an installation which may be of the same general type as the preceding one and used for the same purposes, but in which only the "calcination" part has been shown, including the calcination column and the means used for regulating the temperature in this column.

FIG. 1 shows an installation which will be assumed to be used for regenerating the alumina used for fixing by adsorption tars and compounds containing fluorine. It may be particularly alumina having served for purifying the smoke from furnaces for baking anodes for electrolysis tanks, for the production of aluminium. It will be understood that the aim of such an invention is then to rid the particles of alumina of the tars which they have adsorbed, without for all that allowing the fluorine to escape into the atmosphere.

The alumina to be treated is fed into a hopper with distributing screw 1, which brings the material, through a duct 2, downstream of the neck 3 of a venturi 4 for carrying out the suspension, which is effected by bringing hot air to the venturi through a pipe 5. The hot air is produced by a gas re-heater 6. The material brought into suspension is directed through a pipe 7 to the inlet of a first contacting column 8. A sufficiently high temperature is maintained in this column to cause as complete a calcination as possible of the tars. This temperature may be of the order of 450° to 900° C., the tars being calcined from about 450° C. To this end, the temperature at the outlet of the column 8 is regulated. For this, a temperature sensor 9 is disposed on the outlet pipe 10 of the column, and whose signal, through a connection 11 and regulator 12, may control the opening of a valve 13 admitting combustible gas to the gas re-heater 6.

The mixture coming from the column and formed of particles of alumina freed of tars, of fluorine partially desorbed by the particles and air, is brought by pipe 10 to a separating device such as a cyclone 14. The gaseous part exits therefrom through a pipe 15 and the solid part through a distributing valve 14a. A proportion of this gaseous part passing through pipe 15 may return to the inlet of contacting column 8 through a pipe 16, a suction device 17, the gas re-heater 6, pipe 5 and venturi 4. Thus a part of the heat from said gaseous part is recovered and the risk of its containing unburnt portions is reduced.

Similarly and for the same reasons, there may be recycled, through a pipe 18 towards venturi 4 (downstream of its neck 3), a measurable part of said powdery material, partially purified, collected at the outlet of cyclone 4, which allows the calcination of the tars to be completed.

The other part of this material is fed to the inlet of a second contacting column 20 for causing the re-adsorption, on the alumina, of the fluorine desorbed in the first column because of the presence therein of a high temperature. To obtain excellent heat exchanges and an excellent contact between the gaseous part and the powdery material, the material may, here also, be put into suspension by bringing it downstream of the neck 21 of a venturi 22, in connection with said column 20 through a pipe 23.

The path of the powdery material between the distributing valve 18 and venturi 22 may be direct, but it may also comprise an oxidizing hopper 24 with a porous bottom 25, in which the material may be subjected to a complementary combustion for eliminating particularly the carbon which may remain sticking to the particles. For this, air or oxygen is introduced by a pipe 26 under the porous bottom 25.

Said path may also comprise a cooling device 27, shown with a dash-dot line in the figure and intended to lower the temperature of the particles.

To bring about in the second contacting column 20 an efficient readsorption of fluorine on the particles of alumina, in fact, it is advisable for the temperature in this column to be considerably lower than that which reigns in the first contacting column 8. Preferably, this temperature in the second contacting column will be less than 200° C.

For putting the particles of alumina in venturi 22 in suspension, it is possible to use as gas a part of the gases escaping from the separating device 14 through pipe 15 (the part of the gases which is not recycled through pipe 16 towards the inlet of venturi 4), the remaining part being formed by fresh air brought to venturi 22 through an inlet pipe 28 provided with a flow rate adjusting valve 29.

As for the part of the gas taken up from the separating device 14, there is shown at 30 the pipe which brings it to the inlet of venturi 22. Since the particles at the outlet of separating device 14 may carry fine carbon and alumina dust (dust less than 15 microns), it may be advisable, so as not to find dust at the outlet of the installation, to provide in pipe 30 a filtering device 31. They could be conventional filters with filtering walls made of a woven material.

Pipe 30 may moreover, downstream of its connection with pipe 15 receiving gases from the separating device 14, be connected to an exchange element 30a of a heat exchanger whose other exchange element, shown at 32 in the figure, may connect the above-mentioned return pipe 16 to a source of new air with adjustable flow rate 33. Thus, on the one hand the hot gases coming from pipe 15 are cooled before being introduced through venturi 22 into the second contacting column 20 and, on the other hand, the new air of source 33 is re-heated before being fed, by suction device 17, into the first contacting column 8, through venturi 4. Thus the heat contained in the gases coming from separating device 14 is advantageously recovered.

Similarly, as for contacting column 8, the temperature in the second column 20 may be regulated by means of a temperature sensor 32 provided in its outlet pipe 35 and controlling, through a connection 36 and a regulator 37, the opening of the new air admission valve 29. The temperature in the outlet pipe 35 may for example be fixed at 120° C.

Finally, the cooled powdery material on which the fluorine will have been re-adsorbed in contacting column 20 may be filtered in a filter 38 also conventional, the gaseous part thereof leaving through a pipe 39 before being discharged into the atmosphere by a fan 40, whereas the solid part is recovered at the bottom of a hopper 41 of the filter.

The alumina removed from the tar but having entirely re-adsorbed the fluorine desorbed in the first contacting column 8 may be removed through an outlet pipe 42, through a distributing valve 43, but from this latter a part of this material may also be recycled to venturi 22 through a pipe 44. This arrangement enables the re-adsorption of the fluorine on the alumina to be completed and the determination of the proportion of the recycled part may be effected automatically, for example depending on a measurement of the fluorine content of the gases in discharge pipe 39.

As for the non-recycled portion of alumina coming from the outlet pipe 42, equal to the amount of alumina fed into the installation by hopper 1, it may be re-used for purifying smoke coming from the anode baking furnace, according to a known process.

Another portion of this alumina may also be used to supply the electrolysis tanks intended for the production of aluminium.

In the figure, there is shown with a dash-dot line, at 46, another new air input into the installation, upstream of suction device 17, usable conjointly with the new air inlet 33 or in place thereof.

Similarly, there is shown with a dot-dash line 47 a device able to be placed optionally between venturi 4 and the inlet of the first contacting column 8. This may be particularly a chamber provided with burners, particularly gas burners, and in which a sheet of flame is formed which the powdery material in suspension will have to pass through before being introduced into the column. This is an arrangement which may be useful where there might be a risk of certain tar compositions not being entirely calcinated on leaving the column.

It will be noted moreover that the separating device 14 may be formed by a single cyclone but may also and preferably comprise several small cyclones in parallel, these having a better separation efficiency. Thus the proportion of very fine particles in pipe 15 may be reduced and the clogging of the filtering device 31 delayed.

Finally it will be noted that the oxidizing hopper 24 is subjected to a slight depression so that the operation of the cyclone or cyclones of the separating device 14 is not disturbed. This provision of a depression has been schematized in the drawing by a pipe 48 connected to any source of depression, for example at the inlet of suction device 17.

In FIG. 2, the references which are to be found in FIG. 1 designate these same parts.

The hot air is, here also, produced by a gas heater 6 in which the fuel gas admission pipe is provided likewise with a flow rate adjusting valve 13, and the combustive air inlet pipe a blower 51 and a flow rate adjusting register 52. The material brought into suspension is directed by duct 7 to the inlet of contacting column 8 which, here, is surrounded by a double casing 8a. The space thus provided around column 8 may be given the shape of a helix by means of a helicoidal intermediate wall 8b.

The mixture coming from column 8 and formed of particles of alumina freed from tar, combustion gas, fluorine partially desorbed by the particles and air is, here also, fed by duct 10 to the separating device 14. The gaseous part exits therefrom at $S_1$ through duct 15 and the solid part at $S_2$ through the distributing valve 14a.

It will be evident that this solid part exiting at $S_2$ may be subjected to a further treatment, for example cooling, with use, possibly, of the gaseous flow exiting at $S_1$.

A certain proportion of the gaseous portion exiting through pipe 15 may return to the inlet of contacting column 8 through pipe 16, the suction device 17, the gas heater 6, pipe 5 and the device for putting the material into suspension 4.

By-passing this circuit, on each side of a register 50 provided in pipe 16, are two pipes 53 and 54 connected respectively to the upper end and the lower end of the helical space provided around column 8, this, as explained above, on the one hand for cooling column 8, and on the other hand for recovering the heat thus brought to the inlet of the column and to reduce the consumption of combustible gas. A fresh air input is provided at 46, through a pipe connected to pipe 53 and provided with a flow rate adjustment register 49.

The temperature at the outlet of column 8 is regulated to a standard value. For that there is provided a temperature sensor 9 in outlet pipe 16; its signal, through the proportional acting regulator 12, may control in cascade, and successively, the valve 13 admitting combustible gas to gas heater 6 and register 49 adjusting the new and fresh air inlet 46.

It should be noted that the amount of new air admitted by this register is always greater than the stoechiometric amount consequent on the quantity of pollutants to be calcinated.

If, for example, the temperature detected increases, regulator 12 controls first of all the reduction of the admission of combustible gas to heater 6 then, progressively, the opening of register 49 so as to admit a greater amount of new and fresh air.

The by-pass register 50 allows the proportion of gases from column 8 recycled by the heater to be adjusted without having previously circulated in the space of the double casing 8a.

In a variation, the regulator 12 could control only the register 49 regulating the admission of new air 46, according to the procedure which has just been described. The regulation of the input of combustible gas to heater 6 would then be achieved by means of a second regulator placed under the control of a temperature sensor which would be disposed in the inlet pipe 5 of the column.

We claim:

1. A process using two contacting columns for regenerating an adsorbent material charged with at least two volatile compounds having different thermal stabilities which comprises the steps of
   (a) calcinating at least one of the volatile compounds in the adsorbent material by raising the temperature in the first column to a sufficiently high temperature and by driving the adsorbent material through the column with a stream of oxidizing gas and thereby putting the material into suspension
   (b) at the outlet of the first column separating the partially purified adsorbent material from the oxidizing gases and the gaseous products desorbed from the material in the first column
   (c) introducing the partially purified material from step (b) into the second contacting column and cooling it by putting it into suspension while being driven along through the column by at least a part of the gases separated in step (b) so as to readsorb on the partially purified material the gases which were desorbed from the material in step (a).

2. The process as claimed in claim 1, wherein a measureable part of said partially purified material obtained after the above-mentioned separating operation in step (a) is recycled to the inlet of said first contacting column, to complete the calcination.

3. The process as claimed in claim 1 or 2, wherein, a separating operation is provided at the outlet of the second contacting column between the gases put into suspension and the adsorbing material, and at least partially recycling the adsorbing material to the inlet of said second column, to complete the re-adsorption therein of said gaseous products desorbed in the first column.

4. The process as claimed in 1 or 2 claims, wherein the adsorbing matter is put into suspension, not only upstream of the first contacting column but also upstream of the second, by bringing the material downstream of the neck of a venturi through which passes the gaseous stream supplying the column considered.

5. The process as claimed in 1 or 2, wherein to complete the calcination, the partially purified material coming from the first column, obtained after separation, is subjected to a complementary oxidization, before being re-introduced into said second column.

6. The process as claimed in claim 1 or 2, wherein the calcination is effected in a fluidized bed by introduction of a combustive gas.

7. The process as claimed in claims 1 or 2, wherein the part of the gases coming from the first contacting column after separation from the adsorbing material is filtered before introduction into the second column.

8. The process as claimed in 1 or 2, wherein said stream of oxidizing gas which, in the first contacting column, drives along and puts into suspension the absorbing matter to be regenerated, is formed by hot air whose temperature is regulated automatically depending on the temperature measured at the outlet of the column, this air being possibly formed in part by new air, in part by recycling the already-hot air obtained at the outlet of said first column after separation of the partially purified adsorbing material, the new air being moreover possibly pre-heated, in an exchanger, by taking heat from the air portion directed towards the inlet of said second column.

9. The process as claimed in 1 or 2, wherein new and fresh air is fed in at the inlet of said second contacting column, at a flow rate regulated automatically from a temperature measurement at the outlet of this column.

10. The process as claimed in 1 or 2, wherein at the inlet of the first contacting column, one of the volatile compounds of the material put into suspension is ignited.

11. The process as claimed in 1 or 2, wherein cooling of the calcined adsorbing material is effected before its introduction into the second contacting column.

12. A process using hot oxidizing gas for regenerating a particulate adsorbing material charged with one or more combustible organic compounds in a double casing column with an annular space about the column which process comprises the steps of:

(a) calcinating at least one of the organic compounds in the column in which the adsorbing material flows through the column while being brought into suspension in a stream of hot oxidizing gas which gas exits the column at the outlet; and (b) combining at least a part of the hot gas from the outlet with fresh air or gas thereby creating an auxiliary gas stream which flows through the annular space about the column and flows at least partially into the inlet of the column.

13. The process as claimed in claim 12, wherein the stream of auxiliary gas is made to flow in the annular space along a helical path in a general direction opposite the direction of the hot gas stream flowing inside the column.

14. The process as claimed in claim 12, wherein the auxiliary gas stream is made to flow in the annular space along the helical path in the same general direction as that of the hot gas stream flowing inside the column.

15. The process as claimed in 14, wherein automatic regulation is used for regulating the proportion of new air in the auxiliary gas depending on the temperature of the gaseous current leaving the contacting column.

16. The process as claimed in claim 15, wherein said automatic regulation is adapted to act previously or successively by said cascading action on a means for re-heating the hot oxidizing gas stream.

17. The process as claimed in any one of claims 13, 14, 15, 16 or 1, wherein there is used, for re-heating the hot oxidizing gas stream, a means regulated automatically depending on the temperature of said hot gas stream at the inlet of the contacting column.

* * * * *

UNITED STATES PATENT AND TRADEMARK OFFICE
CERTIFICATE OF CORRECTION

PATENT NO. : 4,276,019
DATED : June 30, 1981
INVENTOR(S) : Remillieux et al.

It is certified that error appears in the above—identified patent and that said Letters Patent is hereby corrected as shown below:

First page, Item 54, and top of Col. 1, change "PROCESS FOR REGENERATING OF AN ADSORBING" to --PROCESS FOR THE REGENERATION OF AN ADSORBENT--;
Column 2, line 57, "columm" should read --column--;
Column 2, line 68, "exchange" should read --exchanger--;
Column 4, line 47, "pullutants" should read --pollutants--;
Column 6, line 12, after "find" insert --this--;
Column 8, line 55, "1 or 2 claims" should read --claims 1 or 2--;
Column 8, line 61, "1 or 2" should read --claims 1 or 2--;
Column 9, line 5, "1 or 2" should read --claims 1 or 2--;
Column 9, lines 7 & 8, "absorbing" should read --adsorbing--;
Column 9, line 26, "1 or 2" should read --claims 1 or 2--.

Signed and Sealed this

Twenty-second Day of September 1981

[SEAL]

Attest:

GERALD J. MOSSINGHOFF

Attesting Officer    Commissioner of Patents and Trademarks